(12) United States Patent
Kawaguchi et al.

(10) Patent No.: US 7,566,745 B2
(45) Date of Patent: Jul. 28, 2009

(54) PHOTOCHEMICALLY REFRACTIVE-INDEX-CHANGING POLYMER, PHOTOCHEMICALLY REFRACTIVE-INDEX-CHANGING POLYMER COMPOSITION, AND METHOD OF REFRACTIVE INDEX REGULATION

(75) Inventors: Yoshihide Kawaguchi, Ibaraki (JP);
Yutaka Moroishi, Ibaraki (JP); Tetsuo Inoue, Ibaraki (JP); Kazunori Mune, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 387 days.

(21) Appl. No.: 10/574,478

(22) PCT Filed: Oct. 1, 2004

(86) PCT No.: PCT/JP2004/014874
§ 371 (c)(1),
(2), (4) Date: Apr. 3, 2006

(87) PCT Pub. No.: WO2005/033153
PCT Pub. Date: Apr. 14, 2005

(65) Prior Publication Data
US 2007/0066705 A1 Mar. 22, 2007

(30) Foreign Application Priority Data
Oct. 3, 2003 (JP) .............................. 2003-345537
Sep. 22, 2004 (JP) .............................. 2004-274513

(51) Int. Cl.
*B26D 11/00* (2006.01)
(52) U.S. Cl. .......................... 522/178; 522/66; 522/102; 522/134; 522/135; 522/142; 525/191; 525/195; 525/196; 526/335
(58) Field of Classification Search ................. 522/264, 522/66, 102, 134, 135, 142, 178; 525/191, 525/195, 196; 526/335
See application file for complete search history.

(56) References Cited

U.S. PATENT DOCUMENTS

| | | | | |
|---|---|---|---|---|
| 3,615,448 | A | * 10/1971 | Yeshin | ..................... 430/281.1 |
| 3,650,669 | A | * 3/1972 | Osborn et al. | .............. 8/115.52 |
| 4,293,674 | A | 10/1981 | Andrews | |
| 4,812,545 | A | * 3/1989 | Renzi et al. | ............... 526/230.5 |
| 6,160,070 | A | * 12/2000 | Yanagase et al. | ......... 526/329.7 |
| 2002/0095010 | A1 | 7/2002 | Cai et al. | |
| 2003/0091310 | A1 | * 5/2003 | Myers | ........................ 385/128 |
| 2003/0134930 | A1 | * 7/2003 | Gaddam et al. | ............. 522/149 |

FOREIGN PATENT DOCUMENTS

| | | |
|---|---|---|
| GB | 836046 A | 6/1960 |
| JP | 64-13139 A | 1/1989 |
| JP | 7-92313 A | 4/1995 |
| JP | 9-178901 A | 7/1997 |
| JP | 10-273505 A | 10/1998 |

OTHER PUBLICATIONS

Mark S. M. Alger, Polymer Science Dictionary, 1989, Elsevier Science, 1ed., p. 313.*
Zhihua Lu, S. Y. Lee et al., "Group transfer copolymerisation of vinyl methacrylate and methyl methacrylate" (1997), Polymer, vol. 38, No. 23, pp. 5893-5895.
Supplementary European Search Report dated Nov. 3, 2006.
Masayoshi Tanaka, et al., "Samarium Enolate on Crosslinked Polystyrene Beads. II. An Anionic Initiator for the Well-Defined Synthesis of Poly(allyl methacrylate) on a Solid Support", Journal of Polymer Science Part A: Polymer Chemistry, Mar. 15, 2003, pp. 858-860, vol. 41, No. 6.
M.J. Bowden, et al., "Mechanism of the Photoinduced Refractive Index Increase in Polymethyl Metacrylate", Applied Optics, Jan. 1974, pp. 112-117, vol. 13, No. 1.
W. J. Tomlinson, et al., "Photoinduced Regractive Index Increase in Poly(methlmethacrylate) and its Applications", Applied Physics Letters, Jun. 15, 1970, pp. 486-489, vol. 16, No. 12.

* cited by examiner

*Primary Examiner*—James Seidleck
*Assistant Examiner*—Jessica Paul
(74) *Attorney, Agent, or Firm*—Sughrue Mio, PLLC

(57) ABSTRACT

A subject for the invention is to provide a method of refractive index regulation by which the refractive index of an optical polymer molding can be efficiently changed without necessitating a complicated step, such as the step of oxidizing beforehand, and which when used for producing an optical device, imparts excellent transparency thereto. Another subject is to provide a photochemically refractive-index-changing polymer or photochemically refractive-index-changing polymer composition for use in the method.

The invention relates to a method of refractive index regulation characterized in that either a photochemically refractive-index-changing polymer which is a polymer of one or more monomers comprising an acrylic vinyl monomer represented by $CH_2=C(R^1)C(=O)O-R^2=CH_2$ (wherein $R^1$ is hydrogen or methyl and $R^2$ is a saturated or unsaturated hydrocarbon group having 1-20 carbon atoms, provided that the monomer may have one or more heteroatoms and halogen atoms in the molecule) as an essential ingredient and which has radial-polymerizable side-chain vinyl groups remaining in the molecule or a composition containing this polymer is irradiated with a radiation, e.g., ultraviolet, to react the vinyl groups and thereby cause a density change so as to result in a refractive-index increase ($\Delta n$) through the irradiation of 0.005 or more.

15 Claims, 3 Drawing Sheets

PHOTOCHEMICALLY REFRACTIVE-INDEX-CHANGING POLYMER, PHOTOCHEMICALLY REFRACTIVE-INDEX-CHANGING POLYMER COMPOSITION, AND METHOD OF REFRACTIVE INDEX REGULATION

FIELD OF THE INVENTION

The present invention relates to a photochemically refractive-index-changing polymer or photochemically refractive-index polymer composition which increases in refractive index upon irradiation with a radiation such as, e.g., ultraviolet and to a method of regulating the refractive index of these.

BACKGROUND ART

Various optical devices including optical fibers, optical diffraction gratings, optical memories, and optical integrated circuits have hitherto been enthusiastically investigated and developed. Recently, polymeric materials excellent in processability, flexibility, and other properties are attracting attention as materials for these optical devices.

In producing an optical device, a technique for precisely regulating the refractive index of the device at will is indispensable. Known as such a technique for use in the case of inorganic materials, for example, is a method in which a glass doped with germanium is irradiated with a light to change the refractive index of the glass and produce an optical diffraction grating.

In the case of polymeric materials, a technique for producing an optical diffraction grating is disclosed in which a material comprising a polymer and, dispersed therein, a low-molecular compound active in photochemical reactions is irradiated with a laser light to induce a photochromic reaction (photobleaching) and thereby change the refractive index (see patent document 1). Also disclosed is a technique in which the photobleaching is used to produce a so-called graded-refractive-index material (GRIN material), wherein the refractive index changes continuously (see patent document 2).

In these techniques, a material obtained by doping with a low-molecular compound or incorporating a low-molecular compound into polymer molecules is used. There have been cases where the low-molecular compound shows enhanced light absorption and prevents the device from having sufficient transparency.

Furthermore, attempts have been made to heighten the refractive index of poly(methyl methacrylate) (PMMA), which is known as a typical polymer for optical use, by light irradiation only, without incorporating a low-molecular compound. This technique brings about a refractive-index difference of 0.051, which is sufficiently large for optical devices, through irradiation with 325-nm light. In this technique, however, methyl methacrylate as a monomer is oxidized beforehand and then polymerized, in order to impart reactivity to PMMA. There has hence been a problem that the production requires much time and the steps are complicated.

There is a report that when methyl methacrylate as a monomer is polymerized without conducting oxidation beforehand, the refractive index of the PMMA does not increase at all upon irradiation with the light (see non-patent document 1). It has further been reported that irradiation with a light having a shorter wavelength, e.g., 0.2537 µm, tends to cause cleavage of the main chain of the PMMA and lower the density thereof (see non-patent document 2). It is suggested therein that to heighten the refractive index is impossible because of Lorentz-Lorenz's formula.

(Patent Document 1)
JP-A-7-92313 (pages 2-3)

(Patent Document 2)
JP-A-9-178901 (pages 2-6)

(Non-Patent Document 1)
M. J. Bowden, E. A. Chandross, and I. P. Kaminow, *Applied Optics*, Vol. 13, p. 113 (1974)

(Non-Patent Document 2)
W. J. Tomlinson, I. P. Kaminow, E. A. Chandross, R. L. Fork, and W. T. Silfvast, *Applied Physics Letters*, Vol. 16, p. 486 (1970)

DISCLOSURE OF THE INVENTION

As described above, in the related-art methods of refractive index regulation, there have been cases where the optical devices produced by the methods are not sufficiently transparent and where the steps are complicated because of, e.g., the necessity of oxidizing the monomer beforehand and this results in impaired efficiency.

Under these circumstances, an object of the invention is to provide a method of refractive index regulation by which the refractive index of an optical polymer molding can be efficiently changed without necessitating a complicated step, such as the step of oxidizing beforehand, and which when used for producing an optical device, imparts excellent transparency thereto. Another object is to provide a photochemically refractive-index-changing polymer or photochemically refractive-index-changing polymer composition for use in the method.

The present inventors made intensive investigations in order to overcome the problems described above. As a result, they have found out a method for efficiently obtaining a polymer having radical-polymerizable side-chain vinyl groups remaining in the molecule by a specific polymerization technique. It has further been found that when a film made of this polymer or of a composition of the polymer is irradiated with a radiation such as, e.g., ultraviolet to cause the side-chain vinyl groups to undergo a crosslinking reaction, then a large change in density occurs and the refractive index can be efficiently changed (increased). In addition, excellent transparency is maintained even after the irradiation. Namely, a novel method of regulating the refractive index of an optical molding was found to be obtained. The invention has been thus completed.

Namely, the invention relates to a photochemically refractive-index-changing polymer characterized in that the polymer is a polymer of one or more monomers comprising an acrylic vinyl monomer represented by the following formula (1):

$$CH_2=C(R^1)C(=O)O-R^2=CH_2 \qquad (1)$$

(wherein $R^1$ is a hydrogen atom or a methyl group and $R^2$ is a saturated or unsaturated hydrocarbon group having 1-20 carbon atoms, provided that the monomer may have one or more heteroatoms and one or more halogen atoms in the molecule) as an essential ingredient, and that the polymer has radial-polymerizable side-chain vinyl groups remaining in the molecule and, upon irradiation with a radiation, undergoes a refractive-index increase ($\Delta n$) through the irradiation of 0.005 or more.

The invention further relates to a photochemically refractive-index-changing polymer composition characterized in that it comprises a photochemically refractive-index-changing polymer having the constitution described above and at least one member selected from a photoinitiator, a sensitizer, and a chain transfer agent, and that upon irradiation with a radiation, the composition undergoes a refractive-index increase (Δn) through the irradiation of 0.005 or more (as measured by the m-Line method in the TE mode).

The invention furthermore relates to a photochemically refractive-index-changing polymer composition characterized in that the composition comprises a polymer which is a polymer of one or more monomers comprising an acrylic vinyl monomer represented by the following formula (1):

$$CH_2=C(R^1)C(=O)O-R^2=CH_2 \qquad (1)$$

(wherein $R^1$ is a hydrogen atom or a methyl group and $R^2$ is a saturated or unsaturated hydrocarbon group having 1-20 carbon atoms, provided that the monomer may have one or more heteroatoms and one or more halogen atoms in the molecule) as an essential ingredient and has radial-polymerizable side-chain vinyl groups remaining in the molecule and at least one member selected from a photoinitiator, a sensitizer, and a chain transfer agent, and that upon irradiation with a radiation, the composition undergoes a refractive-index increase (Δn) through the irradiation of 0.005 or more (as measured by the m-Line method in the TE mode).

The invention still further relates to a method of refractive index regulation characterized in that a photochemically refractive-index-changing polymer or photochemically refractive-index-changing polymer composition having the constitution described above is irradiated with a radiation to thereby cause the polymer or composition to undergo a refractive-index increase (Δn) through the irradiation of 0.005 or more (as measured by the m-Line method in the TE mode).

In particular, the invention can provide a method of refractive index regulation having the constitution described above wherein the radiation is ultraviolet and the polymer or composition is irradiated with ultraviolet in an irradiation dose of 10 J/cm² or less.

The invention still further relates to a process for producing a photochemically refractive-index-changing polymer, characterized by subjecting one or more monomers comprising an acrylic vinyl monomer represented by the following formula (1):

$$CH_2=C(R^1)C(=O)O-R^2=CH_2 \qquad (1)$$

(wherein $R^1$ is a hydrogen atom or a methyl group and $R^2$ is a saturated or unsaturated hydrocarbon group having 1-20 carbon atoms, provided that the monomer may have one or more heteroatoms and one or more halogen atoms in the molecule) as an essential ingredient to anionic polymerization using as a polymerization initiator a metal complex catalyst including a rare earth metal as an active center.

In particular, the invention can provide a process of the constitution described above for producing a photochemically refractive-index-changing polymer wherein the metal complex catalyst including a rare earth metal as an active center is a metal complex compound represented by the following formula (2):

$$(Cp1)(Cp2)Mr-(R)_p-(L)_q \qquad (2)$$

(wherein Cp1 and Cp2 each independently are unsubstituted cyclopentadienyl or a substituted cyclopentadienyl, provided that Cp1 and Cp2 may be bonded to each other directly or through a connecting group; Mr is a rare earth metal atom having a valence of r, provided that r is an integer of 2-4; R is a hydrogen atom or a linear alkyl group having 1-3 carbon atoms; L is a solvent having a coordinating ability; and p is the number of R's and q is the number of L's, p and q each being an integer of 0-2 and selected so as to satisfy the following relationship with the r: r=p+2).

According to the photochemically refractive-index-changing polymer of the invention described above, which has radical-polymerizable side-chain vinyl groups remaining in the molecule, or to the photochemically refractive-index-changing polymer composition of the invention described above, the refractive index of a molding of the polymer or composition can be increased at will by irradiating the molding with a radiation such as, e.g., ultraviolet in a suitable irradiation dose, without via a complicated step such as, e.g., the step of oxidizing beforehand as in a related-art technique.

Furthermore, a change in refractive index can be more efficiently caused by copolymerizing various monomers as comonomer ingredients for the polymer by random or block copolymerization.

Moreover, in the invention, a molding is not doped with any low-molecular compound. Because of this, when the invention is used for producing an optical device, this device has excellent transparency. The difference in refractive index obtained by the invention is 0.005 or larger, which is a sufficiently large value for optical devices.

BEST MODE FOR CARRYING OUT THE INVENTION

Figure 1:
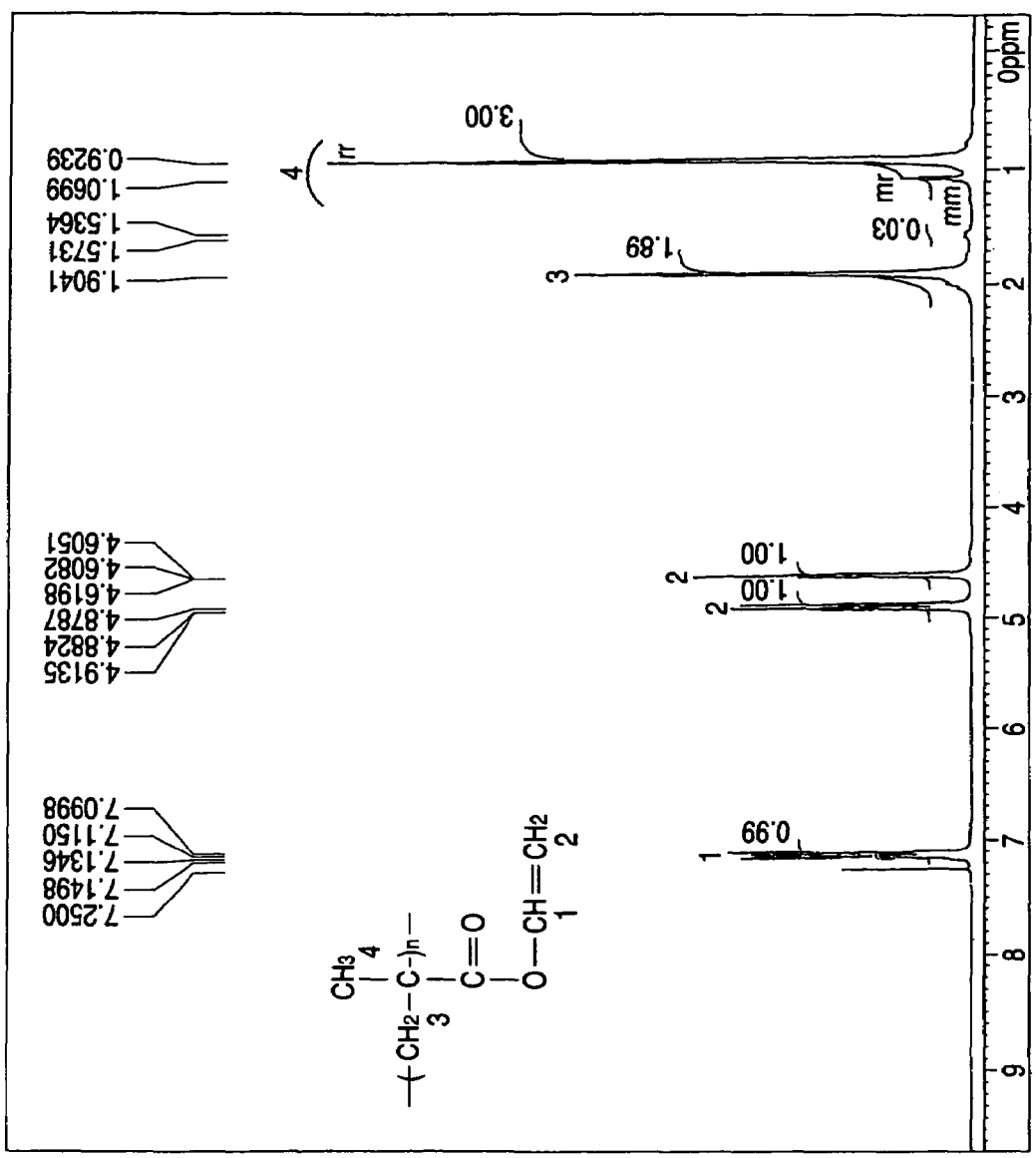
FIG. 1 is a presentation showing a characteristic ¹H-NMR chart of the photochemically refractive-index-changing polymer (poly(vinyl methacrylate); PVMA) obtained in Example 1.

The essential point of the invention resides in that a polymer having radical-polymerizable side-chain vinyl groups remaining in the molecule is irradiated with a radiation to cause the side-chain vinyl groups to undergo a crosslinking reaction and thereby increase the refractive index of the optical polymer molding based on the resultant change in density.

The polymer having radical-polymerizable side-chain vinyl groups remaining in the molecule preferably is poly(vinyl methacrylate) (hereinafter referred to as PVMA). Among optical polymers, PVMA has excellent transparency, is less apt to undergo birefringence, and has satisfactory moldability and balanced mechanical strength. It further has the largest difference in refractive index through irradiation with a radiation. PVMA is hence especially preferably used in the invention. Also preferred are copolymers containing PVMA as a component.

Examples of the radiation include α-rays, β-rays, γ-rays, neutron beams, electron beams, and ultraviolet. However, ultraviolet is especially desirable. This is because use of ultraviolet has advantages, for example, that irradiator simplification is possible and film deterioration is less apt to occur.

The wavelength of the ultraviolet is not particularly limited as long as the wavelength enables the ultraviolet to cause the side-chain vinyl groups to undergo a crosslinking reaction and thereby change the structure of the polymer and bring about a large change in polymer density. For example, although the wavelength of the ultraviolet cannot be unconditionally determined because it varies depending on irradiation intensity, etc., it is preferably 200-450 nm, especially 250-350 nm.

An ultraviolet source is suitably selected while taking account of the wavelength of the ultraviolet to be emitted. Examples thereof include a high-pressure mercury lamp, low-pressure mercury lamp, metal halide lamp, and ultraviolet laser. For the irradiation, a wavelength filter can be used in order to conduct irradiation with ultraviolet having a specific wavelength.

Too low ultraviolet irradiation intensities are unsuitable because irradiation at too low intensities cannot induce the photochemical reaction of the polymer having radical-polymerizable groups in the molecule and a change in refractive index cannot hence be obtained. Conversely, when the intensity is too high, there are cases where the molding becomes opaque or brittle. Consequently, the irradiation intensity is suitably determined while taking account of these.

For example, a suitable irradiation intensity is about 0.001-3 W/cm$^2$ although it varies depending on the wavelength of the ultraviolet to be emitted. The intensity is preferably 0.1-1 W/cm$^2$.

The period of ultraviolet irradiation is suitably determined while taking account of the refractive index to be obtained. Namely, the refractive index can be regulated at will by selecting a suitable value of irradiation period, because the refractive index of the molding in the invention continuously increases with the progress of ultraviolet irradiation. The period of irradiation varies depending on the wavelength/intensity of the ultraviolet. For example, however, in the case where a molding of, e.g., PVMA is irradiated with ultraviolet having a wavelength in the range of 280-300 nm at an intensity of 300 mW/cm$^2$ in order to increase the refractive index by 0.01, a suitable irradiation period is about 0.5-2 minutes.

The integrated quantity of ultraviolet is desirably regulated to 10 J/cm$^2$ or smaller, especially 5 J/cm$^2$. Irradiation in more than 10 J/cm$^2$ may result in film deterioration, and is impractical also from the standpoints of the period and cost required therefor.

In ultraviolet irradiation, the molding being irradiated can be kept at an elevated temperature. This enhances the reactivity of the polymer having radical-polymerizable side-chain vinyl groups remaining in the molecule, whereby the refractive index can be more efficiently changed. For example, a suitable temperature can be selected in a range of temperatures not higher than the melting temperature of the molding. However, in the case of a molding made of, e.g., PVMA, a suitable temperature is about 40-70° C.

In thus increasing the refractive index by ultraviolet irradiation, there is especially no need of conducting the irradiation in the presence of an inert gas from the standpoint of practical use of the method for general purposes. It is, however, desirable to conduct the irradiation in the presence of an inert gas such as nitrogen or argon. In this case, a large change in refractive index is apt to be obtained at a lower irradiance because surface oxidation at the film/air interface is inhibited.

Upon irradiation with ultraviolet under such conditions, the radical-polymerizable side-chain vinyl groups remaining in the polymer molecule undergo a crosslinking reaction. As a result, the density increases and the refractive index of the molding can be increased. Any crosslinking reaction can be effectively utilized as that crosslinking reaction, as long as it increases the density by, for example, partly crosslinking the molding.

Incidentally, an increase in refractive index of up to 0.01 can be obtained by the method of the invention. Practically, however, a difference in refractive index of 0.005 or larger is a sufficiently large value for optical devices such as optical fibers and optical diffraction gratings.

In the invention, the refractive index of a photochemically refractive-index-changing polymer is measured by the m-Line method (prism coupling method) with an He—Ne laser (wavelength, 633 nm). In this case, measurement can be made in the TE (transverse electric) mode (mode of light polarization in a direction parallel to the plane of the film material) and the TM (transverse magnetic) mode (mode of polarization in a direction perpendicular to the plane of the film material). However, the increase in refractive index is evaluated in the invention based on refractive indexes determined in the TE mode.

Especially in optical waveguides/optical integrated circuits, a large difference between TE-mode refractive index and TM-mode refractive index is undesirable because it means a high light propagation loss and the optical information comes to have a phase. There is hence a desire for a material which has a small difference in refractive index between the TE mode and the TM mode, i.e., has a small polarization-dependent loss (PDL). Consequently, the difference in refractive index between the TE mode and the TM mode is desirably 0.00100 or smaller, preferably 0.00080 or smaller.

As can be seen from formula (1) given above, the photochemically refractive-index-changing material of the invention comprises an acrylic material Because of this, the material shows lower birefringence than materials in general use as optical-waveguide materials and, hence, advantageously has a low PDL.

When the method of refractive index regulation of the invention described above is utilized, various optical devices can be produced. For example, a platy molding is irradiated with ultraviolet through a mask to form a part having a high refractive index, whereby an optical waveguide/optical integrated circuit can be produced.

Furthermore, a fiber-form molding is irradiated with ultraviolet made to have an interference fringe to thereby periodically change the refractive index of the fiber in the fiber length direction, whereby an optical diffraction grating can be produced. Moreover, it is possible to converge ultraviolet with a lens or the like and to select conditions under which only the part around the focus can undergo a reaction which heightens polarizability, whereby the refractive index of an area located in a specific position in the molding depth direction is increased. This method can be utilized for the production of a three-dimensional optical memory or the formation of the core part of an optical fiber.

The photochemically refractive-index-changing polymer of the invention is the polymer described above which has radical-polymerizable side-chain vinyl groups remaining in the molecule. Namely, it is a polymer of one or more monomers comprising an acrylic vinyl monomer represented by the following formula (1):

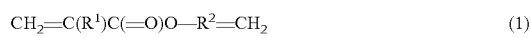

$$CH_2=C(R^1)C(=O)O-R^2=CH_2 \qquad (1)$$

(wherein $R^1$ is a hydrogen atom or a methyl group and $R^2$ is a saturated or unsaturated hydrocarbon group having 1-20 carbon atoms, provided that the monomer may have one or more heteroatoms and one or more halogen atoms in the molecule) as an essential ingredient, and has radial-polymerizable side-chain vinyl groups remaining in the molecule.

Examples of the polymer include (a) a homopolymer of an acrylic vinyl monomer represented by formula (1), (b) a copolymer of two or more acrylic vinyl monomers represented by formula (1), and (c) a copolymer of one or more acrylic vinyl monomers represented by formula (1) and one or more other monomers. These two copolymers may be either block copolymers or random copolymers.

Examples of the acrylic vinyl monomer represented by formula (1) include vinyl methacrylate, vinyl ethyl methacrylate, vinyloctyl methacrylate, vinylhexyl methacrylate, vinylbutyl methacrylate, vinyl acrylate, and vinylethyl acrylate. However, the monomer should not be construed as being limited to these examples. From the standpoints of suitability for general-purpose use and availability, it is especially desirable to use vinyl methacrylate.

The monomers copolymerizable with the acrylic vinyl monomer may be any copolymerizable monomers which are inert to the catalyst to be used for anionic polymerization or do not deactivate the catalyst. Preferred from the standpoint of copolymerizability are (meth)acrylates such as methyl methacrylate and ethyl methacrylate. Also usable are ones containing one or more halogen atoms, such as trifluoroethyl methacrylate, and ones containing one or more heteroatoms, such as diethylaminoethyl methacrylate. Even a monomer having a functional group which deactivates the catalyst can be made usable by capping the functional group. For example, hydroxyethyl methacrylate or the like can be made usable by capping the hydroxyl group with a trimethylsilyl group or the like beforehand. Likewise, (meth)acrylic acid compounds having a carboxyl group can be made usable.

The proportion of the acrylic vinyl monomer represented by formula (1) to other monomers such as those shown above is not particularly limited as long as the desired change in refractive index through irradiation with a radiation is not impaired. In general, when the latter monomers are used in an amount of 10-70% by mole, especially 10-50% by mole, based on all monomers, the merits of the copolymerization can be exhibited without lowering the reactivity of the side-chain vinyl group of the former monomer.

Namely, there is a combination which optimizes the kind of the polymeric material constituting the molding from the standpoints of the film properties and transparency of the molding, production cost, etc. and which enables the refractive index to be changed at a lower radiation irradiance because the copolymerization improves the initial reactivity of the side-chain vinyl groups.

For obtaining the photochemically refractive-index-changing polymer in the invention, it is preferred to use an anionic polymerization initiator. In case where a radical polymerization initiator is used, not only the side-chain vinyl groups also are consumed during the polymerization, making it impossible to obtain vinyl groups for use in attaining a change in refractive index, but also the polymerization gives a solvent-insoluble network polymer (gel). On the other hand, organometallic compounds which are anionic polymerization initiators for general-purpose use, such as BuLi and Grignard reagents, are undesirable because the side-chain vinyl groups partly undergo a crosslinking reaction during the polymerization and because the yield and molecule weight of the polymer obtained are low.

A metal complex catalyst including a rare earth metal as an active center is hence used in the invention as the catalyst for anionic polymerization for obtaining the polymer.

The term rare earth metal herein means a Group 13 metal such as, e.g., Sc, Y, a lanthanoid, or an actinoid, and the term active center means a site which coordinates or bonds to a monomer and directly initiates a polymerization reaction. Such a metal complex catalyst is called a metallocene catalyst. Examples of the metallocene catalyst include complexes of cyclopentadienyl and a metal ion, complexes of indenyl and a metal ion, and complexes of fluorenyl and a metal ion. Especially preferred of these are complexes of cyclopentadienyl and a metal ion.

Such a metal complex catalyst to be used preferably is a metal complex compound represented by the following formula (2):

(wherein Cp1 and Cp2 each independently is an unsubstituted cyclopentadienyl or a substituted cyclopentadienyl, provided that Cp1 and Cp2 may be bonded to each other directly or through a connecting group; Mr is a rare earth metal atom having a valence of r, provided that r is an integer of 2-4; R is a hydrogen atom or a linear alkyl group having 1-3 carbon atoms; L is a solvent having a coordinating ability; and p is the number of R's and q is the number of L's, p and q each being an integer of 0-2 and selected so as to satisfy the following relationship with the r: r=p+2).

In the case where Cp1 or Cp2 in formula (2) is a substituted cyclopentadienyl, the substituents preferably are methyl or trimethylsilyl. The number of the substituents preferably is 3-5.

Examples of Cp1 or Cp2 include $C_5H_5$, $C_5(CH_3)_5$, $C_5H_2(CH_3)_3$, $C_5(CH_2CH_3)_5$, $C_5H_2(CH_2CH_3)_3$, $C_5H_2[CH(CH_3)_2]_3$, $C_5H_2[Si(CH_3)_3]_3$, and $C_5H_2[CH(CH_3)_2]_3$.

Cp1 and Cp2 may be bonded to each other directly or through a connecting group. Especially desirably, Cp1 and Cp2 are bonded to each other through a connecting group.

The connecting group preferably is —$(CH_2)_n$[Si$(CH_3)_2]_m$— [wherein n and m each are an integer of 0 to 3 and (m+n) is 1 to 3], and especially preferably is dimethylsilyl (n is 0 and m is 1) or dimethylene (n is 2 and m is 0). The connecting group may be a group containing a heteroatom such as an etheric oxygen atom.

In formula (2) given above, M is a rare earth metal atom serving as an active center and having a valence of r. It preferably is yttrium (Y), ytterbium (Yb), samarium (Sm), or lutetium (Lu). The valence (r) thereof is 2, 3, or 4, and especially preferably is 2 or 3.

R is a hydrogen atom or a linear alkyl group having 1-3 carbon atoms, and is preferably methyl. L is a solvent having a coordinating ability. It preferably is a solvent containing one or more heteroatoms, and an ether solvent is preferred. Preferred ether solvents are cyclic ether solvents such as tetrahydrofuran and tetrahydropyran, diethyl ether, t-butyl methyl ether, and the like.

Especially preferred of the metal complex compounds represented by formula (2) given above are metal complex compounds represented by any of the following formulae:

(wherein Cp* is 1,2,3,4,5-pentamethylcyclopentadienyl and THF is tetrahydrofuran).

The amount of the metal complex catalyst having a rare earth metal as an active center, which is used as a polymerization catalyst in the invention, is preferably 0.01-10% by mole, especially preferably 0.1-5% by mole, based on the polymerizable monomers. In case where the amount of the metal complex catalyst is too small, it is difficult to cause anionic polymerization to proceed. On the other hand, too large amounts thereof tend to arouse troubles concerning polymer properties such as molecular weight and molecular weight distribution.

It is desirable that anionic polymerization be conducted in the absence of both water and oxygen. It is preferred to conduct the polymerization in an inert gas atmosphere such as nitrogen or argon. Furthermore, the polymerization reaction is desirably conducted in the presence of a solvent, and the solvent preferably is a nonpolar solvent, and especially preferably is an aromatic nonpolar solvent such as benzene, toluene, or xylene.

The amount of the polymerizable monomers during the polymerization is desirably regulated to 5-30% by weight based on the solvent. When the amount of the monomers is smaller than 5% by weight, there is the possibility that a sufficiently high molecular weight cannot be obtained. When the amount thereof exceeds 30% by weight, there is the possibility that the viscosity of the system might increases during the polymerization, resulting in a reduced conversion into polymer.

The polymerization temperature is regulated to preferably 100° C. or lower, especially preferably about −95° C. to +30° C., most preferably −95° C. to −25° C. The lower the temperature at which the polymerization reaction is conducted, the more the stereoregularity and syndiotacticity, which will be described later, of the resultant polymer tend to be improved.

The polymer thus obtained has radical-polymerizable side-chain vinyl groups remaining unreacted in the polymer molecule. The percentage of these residual vinyl groups is preferably 90% or higher, more preferably 95% or higher.

The percentage of radical-polymerizable side-chain vinyl remaining unreacted can be determined, for example, by $^1$H-NMR spectroscopy. For example, in the case of poly (vinyl methacrylate) (PVMA), the percentage thereof can be calculated from the areal ratio between the peak attributable to vinyl-derived protons (around 4.9 ppm) and the peak attributable to protons derived from α-position methyl (1.3-0.6 ppm).

The photochemically refractive-index-changing polymer of the invention obtained by the method of anionic polymerization described above desirably is one having a stereoregularity of 70% or higher in terms of syndiotactivity (rr). When the polymer has such stereoregularity, it has an exceedingly high glass transition point (Tg) and excellent heat resistance.

Namely, the photochemically refractive-index-changing polymer obtained by polymerization in the presence of a metallocene complex catalyst having a rare earth metal as an active center, i.e., the polymer having radical-polymerizable side-chain vinyl groups in the molecule, can have a syndiotacticity (rr) of 70% or higher.

A general explanation on syndiotacticity is as follows.

When a carbon atom of each of repeating units constituting the main chain of a chain polymer molecule has two different atoms or atomic groups (substituents) bonded thereto, stereoisomerism occurs, with the carbon atom as a center. When any adjacent repeating units along the main chain in the polymer always have opposite configurations then this polymer is referred to as a syndiotactic polymer. When any adjacent repeating units along the main chain always have the same configuration, then this polymer is referred to as an isotactic polymer. When the configurations of any adjacent repeating units along the main chain are random, then this polymer is referred to as an atactic polymer. Furthermore, the proportion of syndiotactic segments, that of isotactic segments, and that of atactic segments in the polymer chain including all configurations are referred to as syndiotacticity, isotacticity, and atacticity, respectively.

Syndiotacticity is an index to the stereoregularity of a polymer.

The value of syndiotacticity in the invention is a value which shows the proportion, in terms of % by mole, of monomer units of syndiotactic triads in all monomer-derived units constituting the polymer. In this description, the term triad means a set of three successive repeating units in a polymer. When one of the configurations at the α-carbon (asymmetric carbon) of the carbonyl group in each of the three repeating units is expressed as d and the other as l, then the set of successive units ddd or lll is referred to as an isotactic triad, the set of successive units dld or ldl is referred to as a syndiotactic triad, and the set of successive units ddl, lld, dll, or ldd is referred to as a heterotactic triad.

Syndiotaticity can be determined by nuclear magnetic resonance (NMR) spectroscopy. Specifically, the polymer of the invention is dissolved or swelled in a deuterated solvent in which the polymer is soluble, and this sample is examined by $^1$H-NMR spectroscopy or $^{13}$C-NMR spectroscopy. Integrated values for the signals respectively reflecting syndiotacticity, isotacticity, and atacticity are determined and the ratio among these is determined, whereby the syndiotacticity can be calculated.

In the case where the polymer of the invention is poorly soluble in the deuterated solvent, an additional portion of the deuterated solvent or an undeuterated solvent may be added thereto according to need before use. In the case where an undeuterated solvent is used, it is preferred to select a solvent comprising atoms which exert no influence on NMR analysis. Examples thereof include heavy chloroform and heavy benzene, which exert no influence on $^1$H-NMR spectral data.

Incidentally, the selection of a nucleus to be examined in NMR spectroscopy can be suitably changed according to the spectral pattern for the polymer. Basically, analysis based on a $^1$H-NMR spectrum is preferred. In the case where a necessary peak in $^1$H-NMR data overlaps with an unnecessary peak or where examination by $^1$H-NMR spectroscopy is impossible, it is preferred to use a $^{13}$C-NMR spectrum.

For example, in the case where the substituent X bonded to the α-carbon of the carbonyl group in the vinyl(meth)acrylate monomer is a hydrogen atom or methyl, the $^1$H-NMR signal attributable to this X has a chemical shift which differs among the hydrogen atoms in syndiotactic triads, the hydrogen atoms in isotactic triads, and the hydrogen atoms in atactic triads. This phenomenon is utilized to determine the areal ratio among these signals, whereby the syndiotactic triad (rr)/atactic (also called heterotactic) triad (mr)/isotactic triad (mm) proportion (rr/mr/mm) can be determined.

For assignment in NMR spectra, reference was made to *Shinpan Kōbunshi Bunseki Hando Bukku*, compiled by The Japan Society for Analytical Chemistry (1995) and *Mackromol. Chem., Rapid. Commun.*, 14, 719(1993).

Furthermore, in the case where the substituent bonded to the α-carbon of the carbonyl group in the vinyl(meth)acrylate monomer is a fluorine atom or trifluoromethyl, syndiotacticity can be determined from an areal ratio among $^{13}$C-NMR peaks.

Namely, the phenomenon in which the $^{13}$C-NMR signal attributable to the α-carbon of the carbonyl group differs among the carbon atoms in syndiotactic triads, the carbon atoms in isotactic triads, and the carbon atoms in atactic triads is utilized to determine the areal ratio among these peaks, whereby (rr/mr/mm) can be determined.

Syndiotacticity in the invention is a value calculated from the thus-determined tacticities and expressed as [rr/(rr+mr+ mm)]×100 (%). The polymer obtained by the process of the invention has a value of this syndiotacticity (rr) as high as 70% or above. Because of this, the polymer is superior in heat resistance and strength to atactic polymers. The higher the syndiotacticity, the more these properties improve.

Compared to polymers heretofore in use, the polymer of the invention has better material properties concerning heat resistance and strength. The polymer of the invention has a number-average molecular weight of 2,000 or higher. Since higher molecular weights are desirable from the standpoints of strength and material properties, the molecular weight of the polymer is preferably 20,000 or higher. Usually, the molecular weight thereof is desirably 500,000 or lower.

The photochemically refractive-index-changing polymer of the invention, which has the constitution described above, should show a refractive-index increase ($\Delta n$) of 0.005 or more, preferably 0.01 or more, upon irradiation with a radiation. As long as a difference in refractive index of 0.005 or larger is obtained, the polymer is applicable to optical devices such as, e.g., optical fibers and optical diffraction gratings. In this irradiation, the radiation dose in the case of, e.g., ultraviolet is desirably 10 J/cm$^2$ or less, preferably 5 J/cm$^2$ or less. When it is necessary to irradiate the polymer with ultraviolet in a dose exceeding 10 J/cm$^2$, there are cases where the film yellows and come to have impaired transparency or where the film changes in shape (shrinks).

In the invention, a so-called photoinitiator, which generates a radical species by the action of light, can be incorporated into the photochemically refractive-index-changing polymer according to need. A photosensitizer may also be incorporated as a photoinitiator aid. Furthermore, a chain transfer agent may be incorporated. By incorporating such a photoinitiator, photosensitizer, or chain transfer agent, the reactivity in crosslinking of the side-chain vinyl groups is improved and a change (increase) in refractive index can be more satisfactorily caused.

The photoinitiator, sensitizer, or chain transfer agent can be used at will according to purposes. For example, examples of photoinitiators which show absorption in the ultraviolet region and generate a radical include hydrogen abstraction type initiators such as benzophenone compounds, acetophenone compounds, and thioxanthone compounds, and intramolecular cleavage type initiators such as benzoin compounds and alkylphenone compounds [reference: *Hikari Kōka Gijutsu Jitsuyō Gaido* (Technonet Co., Ltd.), 2002].

Examples of the photosensitizer (photoinitiator aid) include amine compounds such as triethanolamine and triisopropanolamine and amino compounds such as ethyl 4-dimethylaminobenzoate. However, the photosensitizer should not be construed as being limited to these. [Reference: *Shigaisen Kōka Shistem* (Sogo Gijutsu Center) 1990].

In U.S. Pat. No. 3,652,275, there is a statement to the effect that use of a chain transfer agent in combination with a photoinitiator is effective in photocuring systems.

Examples of such a chain transfer agent include ones selected from the group consisting of trimethylolpropane tris-3-mercaptopropionate, N-phenylglycine, 1,1-dimethyl-3,5-diketocyclohexene, 2-mercaptobenzothiazole, 2-mercaptobenzoxazole, 2-mercaptobenzimidazole, pentaerythritol tetrakis(mercaptoacetate), 4-acetamidothiophenol, mercaptosuccinic acid, dodecanethiol, β-mercaptoethanol, 2-mercaptoethanesulfonic acid, 1-phenyl-4H-tetrazole-5-thiol, 6-mercaptopurine monohydrate, bis(5-mercapto-1,3,4-thiodiazol-2-yl, 2-mercapto-5-nitrobenzimidazole, 2-mercapto-4-sulfo-6-chlorobenzoxazole, and the like. From the standpoints of compatibility with the polymer, reaction-accelerating properties, and suitability for general-purpose use, especially preferred compounds are 2-mercaptobenzoxazole (2-MBO), 2-mercaptobenzimidazole (2-MBI), 2-mercaptobenzthiazole (2-MBT), trimethylolpropane tris-3-mercaptopropionate, and the like.

In the invention, the increase of refractive index by a light mainly in the ultraviolet region as a radiation is described. However, it can be easily presumed from the principle of the refractive-index increase that even a light in a region other than ultraviolet (e.g., visible region) is expected to cause an increase in refractive index when use is made of a combination with a photosensitizer or chain transfer agent which shows absorption at the wavelength of the light and can excite the initiator.

As stated above, radiations other than ultraviolet, such as α-rays, β-rays, γ-rays, neutron beams, electron beams, and the like, can be used in the invention.

Furthermore, the material to be treated by the invention is not limited to polymers which, when used alone, undergo a refractive-index increase ($\Delta n$) of 0.005 or more, like the photochemically refractive-index-changing polymer described above. A photochemically refractive-index-changing polymer composition into which at least one member selected from the photoinitiator, photosensitizer, and chain transfer agent described above has been incorporated can also be used to accomplish the objects of the invention.

In such a composition also, the irradiation dose of the radiation in the case of, e.g., ultraviolet is desirably 10 J/cm$^2$ or less, preferably 5 J/cm$^2$ or less, in order to obtain a refractive-index increase ($\Delta n$) through the irradiation of 0.005 or more (preferably 0.01 or more).

EXAMPLES

Examples of the invention will be given below, in which PVMA, i.e., a homopolymer of vinyl methacrylate (Example 1), random copolymers of vinyl methacrylate and another monomer (Examples 2 to 4), and block copolymers of vinyl methacrylate and another monomer (Examples 8 and 9) were used as polymers, and these photochemically refractive-index-changing polymers or compositions of the polymers were irradiated with ultraviolet to increase the refractive index thereof.

Examples (Examples 5 to 7) in which PVMA was used as a polymer and ultraviolet irradiation was conducted in a nitrogen gas atmosphere will also be given below. Furthermore, for the purpose of comparison, an Example (Comparative Example 1) in which poly(methyl methacrylate) was irradiated with ultraviolet will also be given.

Example 1

(Synthesis of Catalyst)

A catalyst for anionic coordination polymerization was synthesized in the following manner.

Into a 1-liter flask the atmosphere in which had been replaced with argon were introduced 3.9616 g of SmI$_2$ and 330 mL of tetrahydrofuran. Thereto was added, with stirring, 45.858 g of pentamethyl cyclopentadienylpotassium salt [(C$_5$Me$_5$)K]. This mixture was reacted at room temperature. Thereafter, the THF was removed under reduced pressure, and toluene was added to the residual solid matter. The supernatant was recovered and vacuum drying was conducted. Recrystallization of [(C$_5$Me$_5$)$_2$Sm(THF)$_2$] was then conducted with THF and hexane. In 60 mL of toluene was dissolved 2.5 g of this [(C$_5$Me$_5$)$_2$Sm(THF)$_2$]. Thereto was added 2.2 mL of triethylaluminum. This mixture was reacted with stirring. The resultant precipitate was removed and recrystallization was then conducted to obtain $(C_5Me_5)_2SmMe(THF)$.

(Synthesis of PVMA)

Eighty milliliters of toluene which had been sufficiently dried and degassed was introduced into a Schlenk tube from which water and air had been sufficiently removed. Thereto was added 20 mL (18.7 g; 166.4 mmol) of vinyl methacrylate which had been dried with $CaH_2$ and then purified by distillation. After the internal temperature was regulated to −78° C., a dilution of 0.189 g (0.373 mmol) of the $(C_5Me_5)_2SmMe$ (THF), which was a catalyst synthesized by the method described above, with 5 mL of dry toluene was introduced into the Schlenk tube to initiate polymerization. The catalyst was used in such an amount that the monomer/catalyst ratio was 446, and the theoretical molecular weight was set at about 50,000. The reaction mixture was reacted at a polymerization temperature of −78° C. for 3 hours. Thereafter, methanol was added to the reaction system to terminate the polymerization reaction. Methanol was further added to precipitate the polymer yielded (poly(vinyl methacrylate)). The polymer was isolated, dissolved in ethyl acetate, and then purified by reprecipitation with methanol.

The polymer was dried by vacuum drying. The amount of the polymer yielded was 18.7 g (yield >99% by weight). The number-average molecular weight (Mn) and weight-average molecular weight (Mw) thereof determined by GPC (gel permeation chromatography) were 77,000 and 115,000, respectively, and the molecular weight distribution (Mw/Mn) thereof was 1.49. Furthermore, the percentage of radical-polymerizable side-chain vinyl groups remaining in the polymer as determined by $^1$H-NMR spectroscopy [percentage of remaining vinyl groups (%)=vinyl group (4.9 ppm)/methyl group (1.3-0.6 ppm)×100] was 100%, and the stereoregularity of the main chain was 92% in terms of syndiotacticity (rr).

Figure 2:
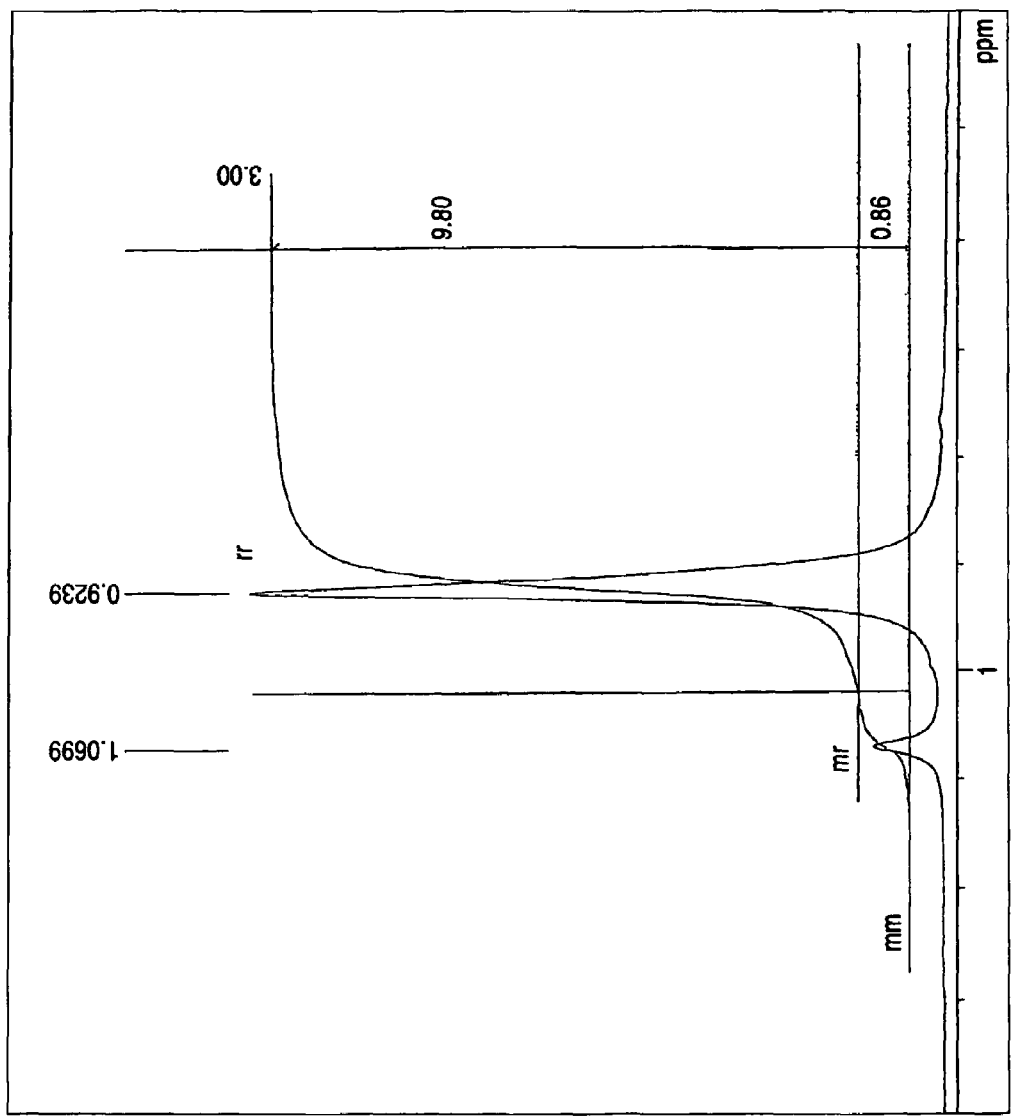
FIG. 2 is an enlargement of that part of the ¹H-NMR chart of FIG. 1 which is for main-chain methyl groups and was used for calculating tacticity.

A $^1$H-NMR chart of the polymer (poly(vinyl methacrylate)) is shown in FIG. 1. In FIG. 2 is shown an enlargement of that part of the $^1$H-NMR chart which was for main-chain methyl groups and was used for calculating tacticity. For the calculation of tacticity was used an integral curve for the methyl groups of the main chain of the poly(vinyl methacrylate) which were detected at 1.2-0.9 ppm [around 1.19 ppm (mm), 1.07 ppm (mr), 0.92 ppm (rr)].

Subsequently, about 0.1 g of the poly(vinyl methacrylate) (PVMA) thus obtained was immersed in 50 mL of ethyl acetate and was shaken with the solvent for 2 days. The ethyl acetate insoluble component was extracted and sufficiently dried. The weight thereof was divided by the weight of the whole polymer as measured before dissolution in the ethyl acetate to thereby determine the proportion of the insoluble component (gel content). As a result, the gel content was found to be 0% by weight.

(Production of Light Irradiation Sample)

In 0.4 mL of ethyl acetate was added 0.1 g of the PVMA. This mixture was stirred to completely dissolve the polymer. Subsequently, this PVMA/ethyl acetate solution was applied to a silicon wafer by spin coating with a spin coater (trade name "Spin Coater 1H-DX" manufactured by MIKASA) in a clean room. The spin coating conditions included 2,000 rpm and 2 seconds. Thereafter, the silicon wafer was dried on a hot plate regulated to 80° C. to remove the solvent for about 4 minutes. Furthermore, the spin-coated wafer was vacuum-dried at 50° C. for 5 hours to obtain a PVMA film having a thickness of about 7 μm on the silicon wafer. In the procedure described above, the silicon wafer was used without undergoing any particular cleaning treatment beforehand.

Subsequently, the PVMA film on the silicon wafer was irradiated with ultraviolet. For the irradiation were used UV irradiator CV-110Q-G [apparatus type designation; manufactured by Fusion UV Systems Japan K.K.] and a metal halide lamp as a light source. The metal halide lamp emitted a light having wavelengths of 250-450 nm. However, when the PVMA was examined beforehand for an ultraviolet/visible absorption spectrum, the polymer showed absorption at 280-300 nm due to the side-chain vinyl groups. Because of this, irradiation at the other wavelengths was judged to exert no influence and a wavelength filter was not especially used.

The irradiation intensity was measured with a UV radiometer for high energy and a UV power pack irradiation meter [trade name; manufactured by Fusion UV Systems Japan K.K.]. The ultraviolet irradiation was conducted under the conditions of D-bulb, output of 55%, irradiation distance of 25 mm, and line speed of 2 m/min without using a filter. Under these conditions, the integrated quantity of light was 4.242 J/cm$^2$. The irradiance and quantity of light for each wavelength region are shown in Table 1.

TABLE 1

| UV wavelength region | Irradiance (W/cm$^2$) | Quantity of Light (J/cm$^2$) |
|---|---|---|
| UVA (320–390 nm) | 1.373 | 1.971 |
| UVB (280–320 nm) | 0.725 | 0.962 |
| UVC (250–260 nm) | 0.071 | 0.100 |
| UVV (395–445 nm) | 0.861 | 1.209 |
| Integrated quantity | — | 4.242 |

With respect to each ultraviolet irradiation period, the refractive index of the PVMA film was measured with an He—Ne laser (wavelength, 633 nm) by the m-Line method (prism coupling method) in the TE (transverse electric) mode (mode of light polarization in a direction parallel to the plane of the film material) and TM (transverse magnetic) mode (mode of polarization in a direction perpendicular to the plane of the film material). The results are as shown in Table 2.

TABLE 2

| Integrated quantity of light (J/cm$^2$) | TE mode | Δn (refractive-index difference) | TM mode | Δn (refractive-index difference) |
|---|---|---|---|---|
| 0 | 1.49510 | — | 1.49486 | — |
| 4.2 | 1.50399 | 0.00899 | 1.50505 | 0.01019 |
| 8.4 | 1.50599 | 0.01089 | 1.50609 | 0.01123 |

As apparent from the results given above, the irradiation in an integrated quantity of light of 8.4 J/cm$^2$ could increase the refractive index, as measured in the TE mode, from 1.49510 to 1.50599 (refractive-index difference, 0.01089). This refractive-index difference obtained was a sufficiently large value for application to optical devices. The birefringence (absolute value of TM-TE) in this sample was as extremely small as 0.0001.

Subsequently, the film which had been irradiated in an integrated quantity of light of 8.4 J/cm$^2$ was evaluated for transparency and haze with reflectometer/transmissometer Type HR-100 [device type designation; manufactured by Murakami Color Research Laboratory Co., Ltd.]. As a result, the total light transmittance and haze of the film after the ultraviolet irradiation were found to be 92% and 3%, respectively.

Example 2

(Synthesis of Random Copolymer of VMA and Another Monomer)

The catalyst synthesized in Example 1 was used to synthesize a random copolymer of vinyl methacrylate (VMA) and methyl methacrylate (MMA).

Fifty milliliters of toluene which had been sufficiently dried and degassed was introduced into a Schlenk tube from which water and air had been sufficiently removed. Thereto was added 7.5 mL (7.0 g; 62.4 mmol) of VMA and 7.5 mL (7.0 g; 70.1 mmol) of MMA which had been dried with $CaH_2$ and then purified by distillation. After the internal temperature was regulated to −78° C., a dilution of 0.198 g (0.390 mmol) of the $(C_5Me_5)_2SmMe(THF)$ as a catalyst with 5 mL of dry toluene was introduced into the Schlenk tube to initiate polymerization. The catalyst was used in such an amount that the monomer/catalyst ratios were 160 (VMA) and 180 (MMA), and the theoretical molecular weight was set at about 36,000. The reaction mixture was reacted at a polymerization temperature of −78° C. for 3 hours. Thereafter, methanol was added to the reaction system to terminate the polymerization reaction. Methanol was further added to precipitate the polymer yielded. The polymer was isolated, dissolved in ethyl acetate, and then purified by reprecipitation with methanol. The polymer obtained (VMA/MMA random copolymer) was vacuum-dried.

This polymer had a VMA/MMA copolymerization proportion (mol %) of 47:53. The amount of the polymer yielded was 8.0 g (yield, 57.1% by weight). The number-average molecular weight (Mn) and weight-average molecular weight (Mw) thereof determined by GPC were 35,900 and 43,600, respectively, and the molecular weight distribution (Mw/Mn) thereof was 1.44. Furthermore, the percentage of radical-polymerizable side-chain vinyl groups remaining in the polymer as determined by $^1$H-NMR spectroscopy [percentage of remaining vinyl groups (%)=vinyl group (4.9 ppm)/methyl group (1.3-0.6 ppm)×100] was 100%, and the stereoregularity of the main chain including the MMA was 90% in terms of syndiotacticity (rr).

Subsequently, about 0.1 g of the polymer thus obtained (VMA/MMA random copolymer) was immersed in 50 mL of ethyl acetate and was shaken with the solvent for 2 days. The ethyl acetate insoluble component was extracted and sufficiently dried. The weight thereof was divided by the weight of the whole polymer as measured before dissolution in the ethyl acetate to thereby determine the proportion of the insoluble component (gel content). As a result, the gel content was found to be 0% by weight (Production of Light Irradiation Sample)

Into the VMA/MMA random copolymer was incorporated 2-methyl-1-[4-(methylthio)phenyl]-2-morpholinopropane-1 ("Irgacure 907" manufactured by Ciba-Geigy Ltd.) as a photoinitiator in an amount of 1% by weight based on the random copolymer. A film was formed on a silicon wafer substrate and the changes in refractive index thereof caused by ultraviolet irradiation were measured by the m-Line method (prism coupling method), in the same manners as in Example 1. The results of this measurement are as shown in Table 3.

TABLE 3

| Integrated quantity of light (J/cm$^2$) | TE mode | Δn (refractive-index difference) | TM mode | Δn (refractive-index difference) |
|---|---|---|---|---|
| 0 | 1.49427 | — | 1.49440 | — |
| 4.2 | 1.50502 | 0.01075 | 1.50525 | 0.01085 |
| 8.4 | 1.50403 | 0.00976 | 1.50415 | 0.00975 |

The results given above clearly show the following. In Example 2, in which a VMA/MMA random copolymer was used, the irradiation in an integrated quality of light of 4.2 J/cm$^2$ could increase the refractive index, as measured in the TE mode, from 1.49427 to 1.50502 (refractive-index difference, 0.01075). This refractive-index difference was a sufficiently large value for application to optical devices. The ultraviolet irradiation dose which brought about the refractive-index change of 0.01 was smaller than the ultraviolet irradiation dose which was required in Example 1 for obtaining almost the same refractive-index change. It has become possible to efficiently obtain the refractive-index change at a lower irradiance. The birefringence (absolute value of TM-TE) in this sample was as extremely small as 0.00023. Furthermore, this film was examined for total light transmittance and haze in the same manner as described above. As a result, the total light transmittance and haze thereof were found to be 92% and 3%, respectively.

Example 3

(Synthesis of Random Copolymer of VMA and Another Monomer)

The same procedure for copolymer synthesis as in Example 2 was conducted, except that the monomer composition was changed so as to consist of 10 mL (83.2 mmol) of VMA and 2.8 mL (16.64 mmol) of N',N'-dimethylaminoethyl methacrylate (DMMA) and that the amount of the $(C_5Me_5)_2$SmMe(THF) as a catalyst and the amount of the toluene were changed to 0.095 g (0.187 mmol) and 51 mL, respectively. Thus, a VMA/DMMA random copolymer was obtained.

This polymer had a VMA/DMMA copolymerization proportion (mol %) of 83:17. The amount of the polymer yielded was 5.45 g (yield, 45.6% by weight). The number-average molecular weight (Mn) and weight-average molecular weight (Mw) thereof determined by GPC were 65,000 and 91,600, respectively, and the molecular weight distribution (Mw/Mn) thereof was 1.41. Furthermore, the percentage of radical-polymerizable side-chain vinyl groups remaining in the polymer as determined by $^1$H-NMR spectroscopy was 100%, and the stereoregularity of the main chain was 92% in terms of syndiotacticity (rr). Furthermore, this polymer was examined for the proportion of the insoluble component (gel content) in the same manner as described above. As a result, the gel content was found to be 0% by weight.

(Production of Light Irradiation Sample)

Subsequently, this VMA/DMMA random copolymer was used to form a film as a light irradiation sample in the same manner as in Example 2. This film was examined for the changes in refractive index caused by ultraviolet irradiation, by the m-Line method (prism coupling method). The results of this measurement are as shown in Table 4.

TABLE 4

| Integrated quantity of light (J/cm$^2$) | TE mode | Δn (refractive-index difference) | TM mode | Δn (refractive-index difference) |
|---|---|---|---|---|
| 0 | 1.49536 | — | 1.49542 | — |
| 4.2 | 1.50440 | 0.00904 | 1.50466 | 0.00924 |
| 8.4 | 1.50573 | 0.01037 | 1.50583 | 0.01041 |

The results given above clearly show the following. In Example 3, in which a VMA/DMMA random copolymer was used, the ultraviolet irradiation in an integrated quality of light of 8.4 J/cm$^2$ could increase the refractive index (TE mode) from 1.49536 to 1.50537 (refractive-index difference, 0.01037). This refractive-index difference was a sufficiently large value for application to optical devices. The birefringence (absolute value of TM-TE) in this sample was as extremely small as 0.00010. Furthermore, this film was examined for total light transmittance and haze in the same manner as described above. As a result, the total light transmittance and haze thereof were found to be 90% and 2%, respectively.

Example 4

(Synthesis of Random Copolymer of VMA and Another Monomer)

The same procedure for copolymer synthesis as in Example 2 was conducted, except that the monomer composition was changed so as to consist of 5 mL (41.6 mmol) of VMA and 5 mL (15.59 mmol) of perfluorooctylethyl methacrylate (trade name "LIGHT-ESTER FM-108" manufactured by Kyoeisha Chemical Co., Ltd.) (hereinafter referred to as PFMA) and that the amount of the $(C_5Me_5)_2SmMe$ (THF) as a catalyst and the amount of the toluene were changed to 0.095 g (0.187 mmol) and 40 mL, respectively. Thus, a VMA/PFMA random copolymer was obtained.

This polymer had a VMA/PFMA copolymerization proportion (mol %) of 73:27. The amount of the polymer yielded was 2.81 g (yield, 21.7% by weight). The number-average molecular weight (Mn) and weight-average molecular weight (Mw) thereof determined by GPC were 41,900 and 56,200, respectively, and the molecular weight distribution (Mw/Mn) thereof was 1.34. Furthermore, the percentage of radical-polymerizable side-chain vinyl groups remaining in the polymer as determined by $^1$H-NMR spectroscopy was 100%, and the stereoregularity of the main chain was 90% in terms of syndiotacticity (rr). Furthermore, this polymer was examined for the proportion of the insoluble component (gel content) in the same manner as described above. As a result, the gel content was found to be 0% by weight.

(Production of Light Irradiation Sample)

Subsequently, this VMA/PFMA random copolymer was used to form a film as a light irradiation sample in the same manner as in Example 2. This film was examined for the changes in refractive index caused by ultraviolet irradiation, by the m-Line method (prism coupling method). The results of this measurement are as shown in Table 5.

TABLE 5

| Integrated quantity of light (J/cm$^2$) | TE mode | Δn (refractive-index difference) | TM mode | Δn (refractive-index difference) |
|---|---|---|---|---|
| 0 | 1.47425 | — | 1.47492 | — |
| 4.2 | 1.48630 | 0.01205 | 1.48656 | 0.01164 |
| 8.4 | 1.48304 | 0.00879 | 1.48334 | 0.00842 |

The results given above clearly show the following. In Example 4, in which a VMA/PFMA random copolymer was used, the ultraviolet irradiation in an integrated quality of light of 8.4 J/cm$^2$ could increase the refractive index (TE mode) from 1.47425 to 1.48304 (refractive-index difference, 0.00879). This refractive-index difference was a sufficiently large value for application to optical devices. The birefringence (absolute value of TM-TE) in this sample was as extremely small as 0.00030. Furthermore, this film was examined for total light transmittance and haze in the same manner as described above. As a result, the total light transmittance and haze thereof were found to be 90% and 3%, respectively.

Example 5

Figure 3:
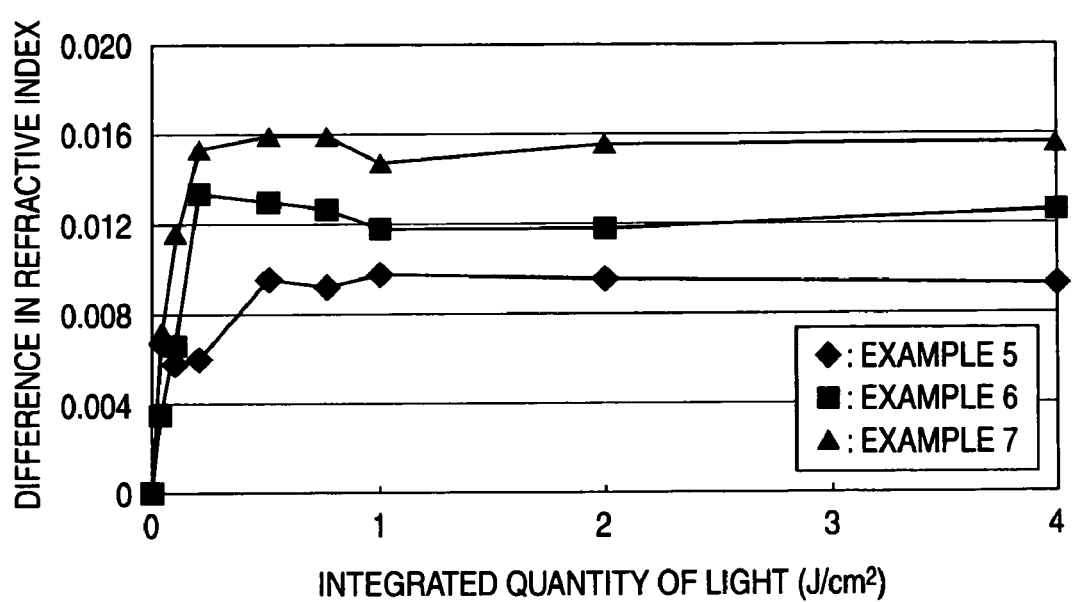
FIG. 3 is a presentation showing the characteristic relationships between the integrated quantity of ultraviolet and difference in refractive index which were determined when the poly(vinyl methacrylate) (PVMA) films of Example 5 (no chain transfer agent as an accelerator) and Examples 6 and 7 (with a chain transfer agent as an accelerator) were irradiated with ultraviolet in a nitrogen gas atmosphere.

A solution prepared beforehand by dissolving 1% by weight 2-methyl-1-[4-(methylthio)phenyl]-2-morpholino-propane-1 ("Irgacure 907" manufactured by Ciba-Geigy Ltd.) as a photoinitiator in ethyl acetate was incorporated into the PVMA obtained in Example 1, in an amount of 1% by weight on a solid basis based on the PVMA. A film as a light irradiation sample was formed in the same manner as in Example 1. This film was examined for refractive-index changes in the same manner as in Example 1, except that ultraviolet irradiation was conducted in a nitrogen gas atmosphere. The results of this measurement are as shown in Table 6 and FIG. 3.

TABLE 6

| Integrated quantity of light (J/cm$^2$) | TE mode | Δn (refractive-index difference) | TM mode | Δn (refractive-index difference) |
|---|---|---|---|---|
| 0 | 1.49325 | — | 1.49291 | — |
| 0.050 | 1.49986 | 0.00661 | 1.50015 | 0.00724 |
| 0.100 | 1.49906 | 0.00581 | 1.49879 | 0.00588 |
| 0.200 | 1.49925 | 0.00600 | 1.49694 | 0.00403 |
| 0.500 | 1.50288 | 0.00963 | 1.50347 | 0.01056 |
| 0.750 | 1.50242 | 0.00917 | 1.50375 | 0.01084 |
| 1.000 | 1.50319 | 0.00994 | 1.50372 | 0.01081 |
| 2.000 | 1.50294 | 0.00969 | 1.50381 | 0.01090 |
| 4.000 | 1.50271 | 0.00946 | 1.50315 | 0.01024 |

The results given above clearly show the following. In Example 5, in which a photoinitiator was incorporated and ultraviolet irradiation was conducted in a nitrogen gas atmosphere, the ultraviolet irradiation in an integrated quantity of light of 0.5 J/cm$^2$ could increase the refractive index (TE mode) from 1.49325 to 1.50288 (refractive-index difference, 0.00963). This refractive-index difference was a sufficiently large value for application to optical devices. The ultraviolet irradiation dose which brought about this change in refractive index was smaller than the ultraviolet irradiation dose which was required for obtaining almost the same refractive-index change in Example 1, in which a nitrogen gas atmosphere was not used. The refractive-index change could be efficiently obtained at a lower irradiance. The birefringence (absolute value of TM-TE) in this sample was as extremely small as 0.00059.

Example 6

A film as a light irradiation sample was formed in the same manner as in Example 5, except that 0.001 g (1% by weight) of 2-mercaptobenzothiazole was incorporated as a chain transfer agent. This film was irradiated with ultraviolet in a nitrogen gas atmosphere in the same manner as in Example 5, and the film was examined for refractive-index changes. The results of this measurement are as shown in Table 7 and FIG. 3.

Example 7

A film as a light irradiation sample was formed in the same manner as in Example 5, except that 0.001 g (1% by weight) of trimethylolpropane tris-3-mercaptopropionate was incorporated as a chain transfer agent. This film was irradiated with ultraviolet in a nitrogen gas atmosphere in the same manner as in Example 5, and the film was examined for refractive-index changes. The results of this measurement are as shown in Table 8 and FIG. 3.

TABLE 7

| Integrated quantity of light (J/cm$^2$) | TE mode | Δn (refractive-index difference) | TM mode | Δn (refractive-index difference) |
| --- | --- | --- | --- | --- |
| 0 | 1.49355 | — | 1.49374 | — |
| 0.050 | 1.49701 | 0.00346 | 1.49762 | 0.00388 |
| 0.100 | 1.50019 | 0.00664 | 1.50106 | 0.00732 |
| 0.200 | 1.50695 | 0.01340 | 1.50759 | 0.01385 |
| 0.500 | 1.50654 | 0.01299 | 1.50631 | 0.01257 |
| 0.750 | 1.50625 | 0.01270 | 1.50621 | 0.01247 |
| 1.000 | 1.50550 | 0.01195 | 1.50501 | 0.01127 |
| 2.000 | 1.50547 | 0.01192 | 1.50578 | 0.01204 |
| 4.000 | 1.50633 | 0.01278 | 1.50646 | 0.01272 |

TABLE 8

| Integrated quantity of light (J/cm$^2$) | TE mode | Δn (refractive-index difference) | TM mode | Δn (refractive-index difference) |
| --- | --- | --- | --- | --- |
| 0 | 1.49245 | — | 1.49261 | — |
| 0.050 | 1.49977 | 0.00732 | 1.49981 | 0.00720 |
| 0.100 | 1.50413 | 0.01168 | 1.50421 | 0.01160 |
| 0.200 | 1.50787 | 0.01542 | 1.50769 | 0.01508 |
| 0.500 | 1.50845 | 0.01600 | 1.50882 | 0.01621 |
| 0.750 | 1.50842 | 0.01597 | 1.50862 | 0.01601 |
| 1.000 | 1.50728 | 0.01483 | 1.50745 | 0.01484 |
| 2.000 | 1.50807 | 0.01562 | 1.50832 | 0.01571 |
| 4.000 | 1.50823 | 0.01578 | 1.50833 | 0.01572 |

The results given above show the following. In Example 6 of Examples 6 and 7, in which a chain transfer agent was added to PVMA, the ultraviolet irradiation in an integrated quantity of light of 0.5 J/cm$^2$ could increase the refractive index (TE mode) from 1.49355 to 1.50654 (refractive-index difference, 0.01299). In Example 7, the ultraviolet irradiation in an integrated quantity of light of 0.5 J/cm$^2$ could increase the refractive index (TE mode) from 1.49245 to 1.50845 (refractive-index difference, 0.01600). These refractive-index differences each were a sufficiently large value for application to optical devices. These changes in refractive index were larger than in Example 5, in which no chain transfer agent was added. The refractive-index changes could be efficiently obtained at a lower irradiance. Furthermore, the birefringences (absolute values of TM-TE) in these samples were as extremely small as 0.00023 for Example 6 and 0.00037 for Example 7.

Example 8

(Synthesis of Block Copolymer of VMA and Another Monomer)

The catalyst synthesized in Example 1 was used to synthesize a block copolymer of VMA and MMA.

Fifty milliliters of toluene which had been sufficiently dried and degassed was introduced into a Schlenk tube from which water and air had been sufficiently removed. Thereto was added 7.5 mL (7.0 g; 70.1 mmol) of MMA (methyl methacrylate) which had been dried with CaH$_2$ and then purified by distillation. After the internal temperature was regulated to −78° C., a dilution of 0.198 g (0.390 mmol) of the (C$_5$Me$_5$)$_2$SmMe(THF) as a catalyst with 5 mL of dry toluene was introduced into the Schlenk tube to initiate polymerization. The catalyst was used in such an amount that the monomer/catalyst ratios were 160 (VMA) and 180 (MMA), and the theoretical molecular weight was set at about 36,000. The reaction mixture was reacted at a polymerization temperature of −78° C. for 3 hours. Thereafter, 7.5 mL (7.0 g; 62.4 mmol) of VMA (vinyl methacrylate) which had been dried with CaH$_2$ and then purified by distillation was added thereto, and polymerization was further conducted at −78° C. for 5 hours. Methanol was added to the reaction system to terminate the polymerization reaction. Thereafter, methanol was further added to precipitate the polymer yielded. The polymer was isolated, dissolved in ethyl acetate, and then purified by reprecipitation with methanol.

The polymer obtained (VMA/MMA block copolymer) was vacuum-dried. This block copolymer had a VMA/MMA copolymerization proportion (mol %) of 47:53. The amount of the polymer yielded was 13.4 g (yield, 95.6% by weight). The number-average molecular weight (Mn) and weight-average molecular weight (Mw) thereof determined by GPC were 35,900 and 43,600, respectively, and the molecular weight distribution (Mw/Mn) thereof was 1.44. Furthermore, the percentage of radical-polymerizable side-chain vinyl groups remaining in the polymer as determined by $^1$H-NMR spectroscopy was 100%, and the stereoregularity of the main chain including the MMA was 90% in terms of syndiotacticity (rr). Furthermore, this polymer was examined for the proportion of the insoluble component (gel content) in the same manner as described above. As a result, the gel content was found to be 0% by weight.

(Production of Light Irradiation Sample)

Into this VMA/MMA block copolymer was subsequently incorporated "Irgacure 907", manufactured by Ciba-Geigy Ltd., as a photoinitiator in an amount of 1% by weight based on the copolymer. A film was formed on a silicon wafer substrate in the same manner as in Example 1. This film was examined for the changes in refractive index caused by ultraviolet irradiation, by the m-Line method (prism coupling method). The results of this measurement are as shown in Table 9.

TABLE 9

| Integrated quantity of light (J/cm$^2$) | TE mode | Δn (refractive-index difference) | TM mode | Δn (refractive-index difference) |
| --- | --- | --- | --- | --- |
| 0 | 1.49406 | — | 1.49422 | — |
| 4.2 | 1.49813 | 0.00407 | 1.49833 | 0.00411 |
| 8.4 | 1.50054 | 0.00648 | 1.50078 | 0.00656 |

The results given above clearly show the following. In Example 8, in which a VMA/MMA block copolymer was used, the irradiation in an integrated quality of light of 8.4 J/cm$^2$ could increase the refractive index (TE mode) from 1.49406 to 1.50054 (refractive-index difference, 0.00648). This refractive-index difference was a sufficiently large value for application to optical devices. The birefringence (absolute value of TM-TE) in this sample was as extremely small as 0.00024. Furthermore, this film was examined for total light transmittance and haze in the same manner as described above. As a result, the total light transmittance and haze thereof were found to be 89% and 3%, respectively.

Example 9

(Synthesis of Block Copolymer of VMA and Another Monomer)

The same procedure for copolymer synthesis as in Example 8 was conducted, except that perfluorooctylethyl methacrylate (the PFMA shown above; same as that described in Example 4) was used in place of the MMA, that the monomer composition was changed so as to consist of 5 mL (41.6 mmol) of VMA and 5 mL (15.59 mmol) of the perfluorooctylethyl methacrylate (PFMA), and that the amount of the toluene introduced into the Schlenk tube and the amount of the $(C_5Me_5)SmMe(THF)$ as a catalyst were changed to 90 mL and 0.095 g (0.187 mmol), respectively. Thus, a VMA/PFMA block copolymer was obtained.

This block copolymer had a VMA/PFMA copolymerization proportion (mol %) of 73:27. The amount of the polymer yielded was 3.20 g (yield, 24.7% by weight). The number-average molecular weight (Mn) and weight-average molecular weight (Mw) thereof determined by GPC were 36,900 and 28,300, respectively, and the molecular weight distribution (Mw/Mn) thereof was 1.30. Furthermore, the percentage of radical-polymerizable side-chain vinyl groups remaining in the polymer as determined by $^1$H-NMR spectroscopy was 100%, and the stereoregularity of the main chain was 91% in terms of syndiotacticity (rr). Furthermore, this polymer was examined for the proportion of the insoluble component (gel content) in the same manner as described above. As a result, the gel content was found to be 0% by weight.

(Production of Light Irradiation Sample)

Subsequently, this VMA/PFMA block copolymer was used to form a film as a light irradiation sample in the same manner as in Example 8. This film was examined for the changes in refractive index caused by ultraviolet irradiation, by the m-Line method (prism coupling method). The results of this measurement are as shown in Table 10.

TABLE 10

| Integrated quantity of light (J/cm$^2$) | TE mode | Δn (refractive-index difference) | TM mode | Δn (refractive-index difference) |
| --- | --- | --- | --- | --- |
| 0 | 1.46621 | — | 1.46615 | — |
| 4.2 | 1.46913 | 0.00292 | 1.46903 | 0.00288 |
| 8.4 | 1.47333 | 0.00712 | 1.47199 | 0.00584 |

The results given above clearly show the following. In Example 9, in which a VMA/PFMA block copolymer was used, the irradiation in an integrated quality of light of 8.4 J/cm$^2$ could increase the refractive index (TE mode) from 1.46621 to 1.47333 (refractive-index difference, 0.00712). This refractive-index difference was a sufficiently large value for application to optical devices. The birefringence (absolute value of TM-TE) in this sample was as extremely small as 0.00134. Furthermore, this film was examined for total light transmittance and haze in the same manner as described above. As a result, the total light transmittance and haze thereof were found to be 88% and 3%, respectively.

COMPARATIVE EXAMPLE 1

A film of poly(methyl methacrylate) (PMMA) (Lot TCR2105, manufactured by Wako Pure Chemical Industries, Ltd.) was irradiated with ultraviolet in the same manner as in Example 1. As a result, even when the PMMA film was irradiated in an integrated quantity of light of 105 J/cm$^2$, the refractive index thereof changed little. Furthermore, the PMMA which had undergone the ultraviolet irradiation was sampled and analyzed by IR and NMR spectroscopy. As a result, it was found that the polymer had undergone almost no crosslinking reaction causing a density change and almost no reaction causing a polarizability increase.

While the invention has been described in detail and With reference to specific embodiments thereof, it will be apparent to one skilled in the art that various changes and modifications can be made therein without departing from the spirit and scope thereof.

This application is based on a Japanese patent application filed on Oct. 3, 2003 (Application No. 2003-345537) and a Japanese patent application filed on Sep. 22, 2004 (Application No. 2004-274513), the entire contents thereof being herein incorporated by reference.

INDUSTRIAL APPLICABILITY

According to the photochemically refractive-index-changing polymer of the invention, which has radical-polymerizable side-chain vinyl groups remaining in the molecule, or to the photochemically refractive-index-changing polymer composition of the invention, the refractive index of a molding of the polymer or composition can be increased at will be irradiating the molding with a radiation such as, e.g., ultraviolet in a suitable irradiation dose, without via a complicated step such as, e.g., the step of oxidizing beforehand as in a related-art technique.

The invention claimed is:

1. A photochemically refractive-index-changing polymer wherein the polymer is one of
   (a) a homopolymer comprising an acrylic vinyl monomer represented by the following formula (1):

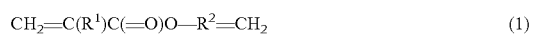
(1)

wherein $R^1$ is a hydrogen atom or a methyl group and $R^2$ is a saturated hydrocarbon group having 1-20 carbon atoms, provided that the monomer may have one or more heteroatoms and one or more halogen atoms in the monomer, and (b) a copolymer comprising two or more acrylic vinyl monomers represented by formula (1), or (c) a copolymer comprising one or two or more acrylic vinyl monomers represented by formula (1) and one or more monomers other than the acrylic vinyl monomers, wherein the polymer has a radical-polymerizable side-chain vinyl group remaining in the monomer and, upon irradiation with a radiation, undergoes a refractive-index increase ($\Delta n$) through the irradiation of 0.005 or more, as measured by the m-Line method in the TE mode, the polymer has a number-average molecular weight of 20,000 or higher, and the polymer has a stereoregularity of 70% or higher in terms of syndiotacticity (rr).

2. The photochemically refractive-index-changing polymer according to claim 1, wherein 90% or more of the radical-polymerizable side-chain vinyl groups remain in the monomer.

3. The photochemically refractive-index-changing polymer according to claim 1, wherein the radiation is ultraviolet.

4. The photochemically refractive-index-changing polymer according to claim 3, which upon irradiation with ultraviolet in an irradiation dose of 10 $J/cm^2$ or less, undergoes a refractive-index increase ($\Delta n$) through the irradiation of 0.005 or more, as measured by the m-Line method in the TE mode,.

5. A photochemically refractive-index-changing polymer composition, which comprises the photochemically refractive-index-changing polymer according to claim 1 and at least one member selected from a photoinitiator, a sensitizer, and a chain transfer agent and, upon irradiation with a radiation, undergoes a refractive-index increase ($\Delta n$) through the irradiation of 0.005 or more, as measured by the m-Line method in the TE mode.

6. A photochemically refractive-index-changing polymer composition, which comprises a polymer which is one of (a) a homopolymer comprising an acrylic vinyl monomer represented by the following formula (1):

$$CH_2=C(R^1)C(=O)O-R^2=CH_2 \qquad (1)$$

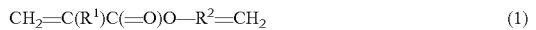

wherein $R^1$ is a hydrogen atom or a methyl group and $R^2$ is a saturated hydrocarbon group having 1-20 carbon atoms, provided that the monomer may have one or more heteroatoms and one or more halogen atoms in the monomer, and (b) a copolymer comprising two or more acrylic vinyl monomers represented by formula (1), or (c) a copolymer comprising one or two or more acrylic vinyl monomers represented by formula (1) and one or more other monomers wherein the polymer has a radical-polymerizable side-chain vinyl group remaining in the monomer; and at least one member selected from a photoinitiator, a sensitizer, and a chain transfer agent, and wherein upon irradiation with a radiation, the composition undergoes a refractive-index increase ($\Delta n$) through the irradiation of 0.00 5 or more, as measured by the m-Line method in the TE mode.

7. The photochemically refractive-index-changing polymer composition according to claim 6, wherein the polymer has 90% or more of the radical-polymerizable side-chain vinyl groups remaining in the monomer.

8. The photochemically refractive-index-changing polymer composition according to claim 6, wherein the polymer has a stereoregularity of 70% or higher in terms of syndiotacticity (rr).

9. The photochemically refractive-index-changing polymer composition according to claim 6, wherein the radiation is ultraviolet.

10. The photochemically refractive-index-changing polymer composition according to claim 9, which upon irradiation with ultraviolet in an irradiation dose of 10 $J/cm^2$ or less, undergoes a refractive-index increase ($\Delta n$) through the irradiation of 0.005 or more ,as measured by the m-Line method in the TE mode.

11. A method of refractive index regulation, wherein the photochemically refractive-index-changing polymer according to claim 1 or the photochemically refractive-index-changing polymer composition according to claim 7 is irradiated with a radiation to thereby cause the polymer or composition to undergo a refractive-index increase ($\Delta n$) through the irradiation of 0.005 or more, as measured by the m-Line method in the TE mode.

12. The method of refractive index regulation according to claim 11, wherein the radiation is ultraviolet.

13. The method of refractive index regulation according to claim 12, wherein the irradiation dose of ultraviolet is 10 $J/cm^2$ or less.

14. A process for producing a photochemically refractive-index-changing polymer, which comprises subjecting (a)' an acrylic vinyl monomer represented by the following formula (1):

$$CH_2=C(R^1)C(=O)O-R^2=CH_2 \qquad (1)$$

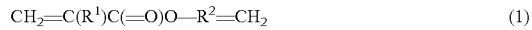

wherein $R^1$ is a hydrogen atom or a methyl group and $R^2$ is a saturated hydrocarbon group having 1-20 carbon atoms, provided that the monomer may have one or more heteroatoms and one or more halogen atoms in the monomer, and (b)' two or more of the acrylic vinyl monomers represented by formula (1), or (c)' one or two or more of the acrylic vinyl monomers represented by formula (1) and one or more other monomers to anionic polymerization using as a polymerization initiator a metal complex catalyst including a rare earth metal as an active center to thereby obtain the photochemically refractive-index-changing polymer according to claim 1.

15. The process for producing a photochemically refractive-index-changing polymer according to claim 14, wherein the metal complex catalyst including a rare earth metal as an active center is a metal complex compound represented by the following formula (2):

$$(Cp1)(Cp2)Mr-(R)_{p'}(L)_q \qquad (2)$$

wherein Cp1 and Cp2 each independently is an unsubstituted cyclopentadienyl or a substituted cyclopentadienyl, provided that Cp1 and Cp2 may be bonded to each other directly or through a connecting group; Mr is a rare earth metal atom having a valence of r, provided that r is an integer of 2-4; R is a hydrogen atom or a linear alkyl group having 1-3 carbon atoms; L is a solvent having a coordinating ability; and p is the number of R's and q is the number of L's, p and q each being an integer of 0-2 and selected so as to satisfy the following relationship with the r=p+2.

* * * * *